United States Patent [19]

Pinchon

[11] Patent Number: 4,972,583
[45] Date of Patent: Nov. 27, 1990

[54] TOOL FOR STRIPPING CABLES

[76] Inventor: Raymond Pinchon, 23 rue des Tilleuis, 76210 Saint Paterne, France

[21] Appl. No.: 418,641

[22] Filed: Oct. 10, 1989

[30] Foreign Application Priority Data

Oct. 27, 1988 [FR] France .................. 88 14052

[51] Int. Cl.⁵ ........................................... B26B 27/00
[52] U.S. Cl. ...................................... 30/90.6; 30/90.9
[58] Field of Search .................... 30/90.6, 90.7, 90.9; 81/9.41, 9.42, 9.43, 9.44

[56] References Cited

U.S. PATENT DOCUMENTS 3,215,007 11/1965 Stallings ........................ 30/90.9

FOREIGN PATENT DOCUMENTS 1289445 11/1960 France .................. 30/90.9
1350818 12/1962 France .................. 30/90.9

*Primary Examiner*—Douglas D. Watts
*Attorney, Agent, or Firm*—Wenderoth, Lind & Ponack

[57] ABSTRACT

A tool in the form of a clamp includes two handles which are articulated about a pin. The end of a first handle carries a longitudinal cutting element which comprises a sharp-edged blade and the corresponding end of the opposite handle carries structure for centering and supporting a cable. Guide elements are arranged upstream of the cutting element and are carried by each of the handles. One of the guide elements is fixed to the free end of an arm mounted on the corresponding handle so as to tilt. The tilting of the arm away from the clamp is limited by an adjustable stop device.

14 Claims, 2 Drawing Sheets

TOOL FOR STRIPPING CABLES

BACKGROUND OF THE INVENTION

The invention relates to tools for stripping electrical or similar cables.

Tools in the form of a clamp are known, the two handles of which are articulated at an intermediate point of their length about a common pin and equipped, at their free ends, one with a rotating longitudinal cutting element and the other with a guiding roller having a trapezoidal recess arranged opposite the cutting element.

French Patent FR-A-2,044,600 discloses a tool of this type in which one of the handles carries a fixed longitudinal cutting element and the other carries means for centering and supporting the cable and including loosely fitted rollers forming two center lines arranged in a V. This tool is provided with means for locking the two handles of the clamp relative to each other in the desired open position. It also comprises radial cutting elements which are carried by each of the two handles as well as stop means intended to limit the distance between the two handles during radial cutting.

All tools which are known for stripping electrical cables have, however, the disadvantage of being unable to ensure an absolutely straight longitudinal cut which makes it more difficult to remove the sheath or the layer which has been cut away.

SUMMARY OF THE INVENTION

The object of the invention is to provide a tool which overcomes this disadvantage by preventing the cable from kinking and by improving the guidance of the cable during longitudinal cutting.

This object is achieved the invention in accordance with by a tool for stripping electrical or similar cables in the form of a clamp, the two handles of which are articulated at an intermediate point of their length about a hinge pin, and in which the end of a first handle carries a longitudinal cutting element comprising a sharp-edged blade and the corresponding end of the opposite handle carries means for centering and supporting the cable. Guide elements are arranged upstream of the cutting element and are carried by each of the handles.

According to further features of the invention:
- the guide elements comprise a pair of opposite rollers which are mounted on spindles which extend approximately parallel to the hinge pin of the clamp, at least one of the rollers having an overall concave shape,
- one of the rollers of the pair of rollers is a cylindrical shape and a sharp-edged element is mounted at the free end of the spindle thereof, the sharp-edged element extending substantially in the same plane as the longitudinal cutting element,
- the sharp-edged element is carried by the first handle and forms a preliminary cutting element,
- one of the roller spindles is fixed to the free end of an arm mounted on the corresponding handle so as to tilt;
- the tool comprises an adjustable stop device which limits the tilting of the arm away from the clamp.

BRIEF DESCRIPTION OF THE DRAWINGS

The invention will now be described in more detail by reference to the attached drawings in which.

DETAILED DESCRIPTION OF THE INVENTION

Figure 1:
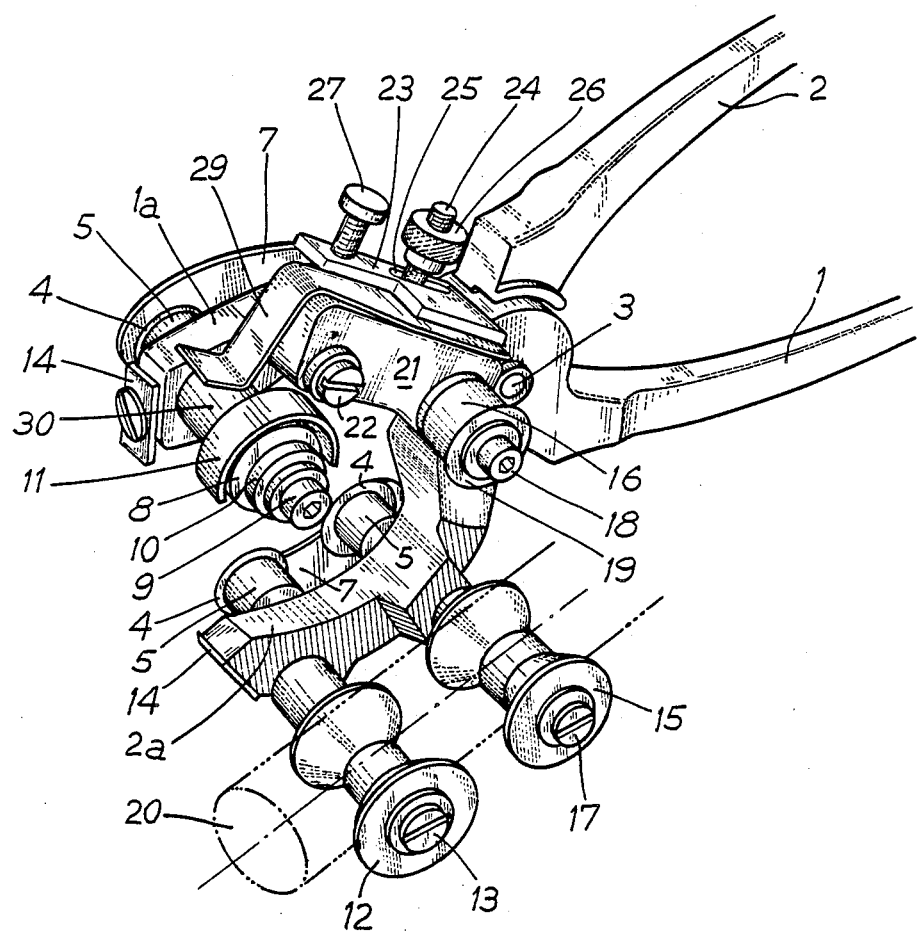
FIG. 1 is a perspective view of a tool provided with a guide cage according to the invention.

FIG. 1 shows an embodiment of a tool for stripping cables according to the invention. The tool is in the form of a clamp which has first and second handles 1, 2 which are articulated about a common pin 3. Each handle has a front part which forms a jaw, referenced 1a and 2a respectively.

The tool is provided with radial cutting elements 4 which are carried by each of the jaws 1a and 1b. The radial cutting elements consist of circular blades which are integral with cylindrical rollers 5 mounted so as to fit loosely over spindles 6 which are fixed laterally to each of the jaws. In the example shown in FIG. 1, each jaw carries two radial cutting elements which are arranged opposite two elements carried by the other jaw. The free ends of the spindles 6 which are carried by the same jaw are interconnected by a protecting plate 7.

The first jaw 1a carries a longitudinal cutting element 8 which is arranged laterally opposite the radial cutting elements 4. The longitudinal cutting element 8 consists of a circular blade mounted so as to fit loosely over a spindle 9 which is fixed to the first jaw 1a. A cylindrical roller 10 is mounted so as to fit loosely over the same spindle on either side of the blade 8. The same spindle carries a safety hood 11 which extends around a part of the blade 8.

Means for centering and supporting the cable are arranged opposite the longitudinal cutting element 8. These means comprise a guiding roller 12 with a trapezoidal recess which is mounted so as to fit loosely over a spindle 13 which is carried by the second jaw 2a and which extends approximately parallel to the hinge pin 3 of the clamp.

A cutting tip 14 is fixed at the end of each of the jaws 1a, 2a. These tips are intended to open up the severed cable sheath so as to make it easier to remove.

The tool according to the invention comprises a guide cage for the cable. In the embodiment shown in FIG. 1 this cage consists of a pair of opposite rollers 15, 16 which are carried by each of the jaws 2a and 1a respectively and which are arranged upstream relative to the longitudinal cutting element 8.

The roller 15 is a trapezoidal, overall concave roller whose central, cylindrical part is in line with the corresponding part of the guiding roller 12. The roller 15 is mounted so as to fit loosely over a spindle 17 which extends parallel to the spindle 13 of the roller 12. The roller situated opposite the pair of rollers 12, 15 is a cylindrical roller 16 which is mounted so as to fit loosely over a spindle 18 which is fixed to the first jaw 1a and extends parallel to the spindle 17 of the roller 15. A sharp-edged element 19 is mounted at the free end of the spindle 18 of the cylindrical roller 16. This sharp-edged element 19 consists of a loosely fitted circular blade that is carried by the same handle 1 as the longitudinal cutting element 8 and extends substantially in the same plane as the latter so as to perform a preliminary cut in a cable 20 which is arranged as shown in FIG. 1 by dot-dashed lines.

Figure 2:
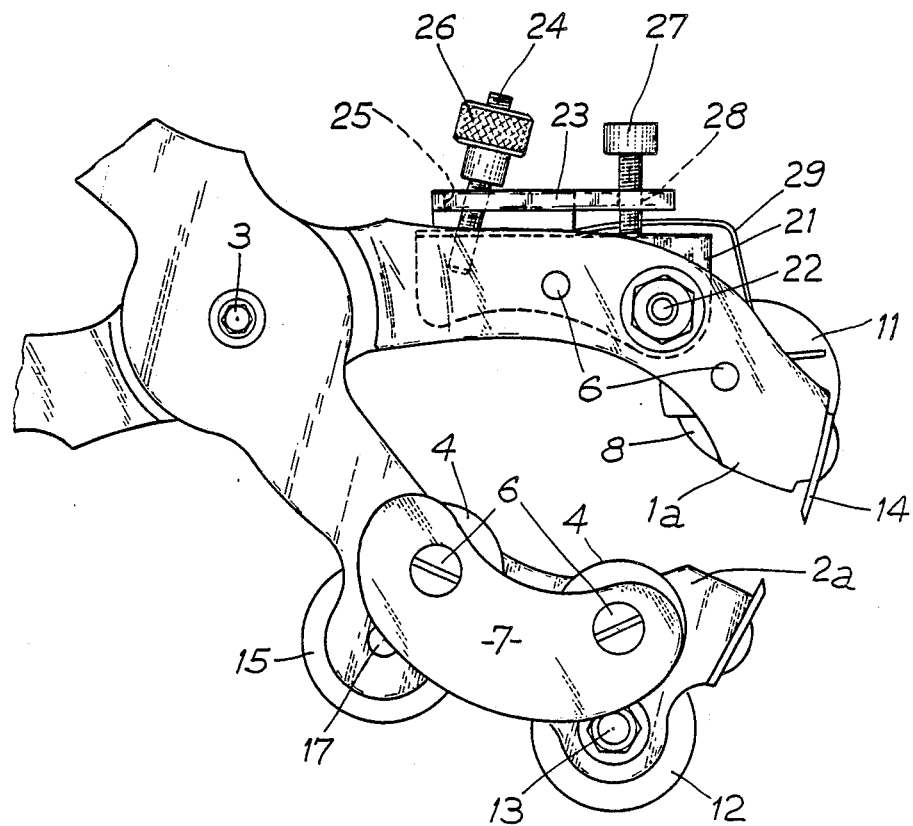
FIG. 2 is a partially cut-away side view of a tool according to the invention.

The spindle 18 which carries the cylindrical roller 16, and also the circular blade 19 which forms the preliminary cutting element, is fixed to the free end of an arm 21 which is mounted on the handle 1 so as to tilt about a spindle 22. The tilting of the arm 21 away from the clamp is limited by an adjustable stop device 23 to 26 (see FIG. 2).

The adjustable stop device comprises an element 23 which is integral with the arm 21 and which projects laterally so as to face the first handle 1, a screw rod 24 which is fixed in the handle 1 and passes through an oblong slot 25 provided in the projecting element 23, and a knurled nut 26 which interacts with the rod 24 so as to form an abutment for the projecting element.

The tilting of the arm 21 towards the clamp is limited by an adjustable stop element. This adjustable stop element consists of a screw 27 which is screwed into a threaded hole 28 provided through the projecting element 23. The screw 27 is intended to abut the first handle 1.

The stop device 23 to 26 and the stop element 27 together form an assembly for locking the arm 21 in a desired position.

The arm 21 is continuously stressed towards the clamp by a resilient element. According to the embodiment shown in the figures, this resilient element consists of a leaf spring 29 which is integral with the arm 21 and has a free end which bears against a projecting part 30 of the handle 1. This projecting part carries at the same time the spindle 9 of the longitudinal cutting blade 8.

Furthermore the position of the nut 26 on the rod 24 which limits the tilting of the arm 21 also serves to limit the cutting depth of the longitudinal cutting element 8, it being understood that the jaws 1a, 2a can be moved towards each other until the cylindrical roller 16 abuts the cable 20 when the guide cage which is formed by the rollers 15 and 16 encloses the latter.

Furthermore, the depth of the radial cut which is made by the elements 4 can advantageously be adjusted by means for stopping the two handles relative to each other, which means are known from the prior art and are not shown in the figures.

According to alternative embodiments of the invention:
- the sharp-edged element 19 is replaced by a wheel (not shown);
- the guide cage is inverted, in other words the trapezoidal roller 15 is carried by the first handle 1 and the cylindrical roller 16, as well as the blade 19, are carried by the second handle 2;
- both rollers 15, 16 of the pair of rollers are rollers which have an overall concave shape;
- the free end of the leaf spring bears against the opposite surface of the projecting part 30 of the corresponding handle and thus causes the arm 21 to be stressed away from the clamp;
- the leaf spring 29 is replaced by a kickover spring which is mounted on the tilting spindle 22 of the arm 21 and one end of which bears against the corresponding handle and the other against the arm.

The tool according to the invention functions in the following manner. After having made a radial cut in the cable 20 with the radial cutting elements 4, the cable is arranged as shown in FIG. 1. The handle 1 is then brought towards the handle 2 until the blade 19 comes to bear against the cable. When the handles are brought closer together the blade 19 penetrates the material of the cable until the roller 16 comes to bear against the cable. At the same time the arm 21 is tilted counter to the action of the spring 29 so as to abut the nut 26. The desired penetration depth of the longitudinal cutting element 8 can then be adjusted using the nut 26. The arm 21 can be locked in a desired position using the screw 27 which is screwed in until it abuts the handle 1.

Once the stop position of the arm 21 away from the clamp has been adjusted using the nut 26, it is possible to strip a whole series of cables of the same diameter without any intermediate adjustment.

The tool is then pulled along the length of cable to be stripped so that the blade 9 makes a preliminary cut in the cutting plane of the longitudinal cutting blade 8 which then follows the line of the preliminary cut so as to make the desired cut.

According to alternative embodiments of the invention the tilting of the arm 21 away from the clamp is adjusted in the same way so as to obtain optimum guidance within the guide cage.

The tool according to the invention thus makes it possible to make an approximately straight longitudinal cut in a cable or a series of cables of the same diameter after having made only one presetting.

I claim:

1. A tool for stripping electrical or similar cables, said tool comprising:
   first and second handles articulated together about a hinge pin at a position intermediate the lengths of said handles, thereby forming a clamp;
   an element in the form of a sharp-edged blade mounted on an outer end of said first handle for cutting a cable longitudinally;
   means, mounted on a corresponding outer end of said second handle, for centering and supporting a cable being cut longitudinally by said sharp-edged blade; and
   first and second guide elements, mounted respectively on said first and second handles at positions between said outer ends thereof and said hinge pin and confronting each other, for guiding a cable being cut longitudinally by said sharp-edged blade.

2. A tool as claimed in claim 1, wherein said guide elements comprise a pair of opposite rollers mounted on spindles extending approximately parallel to said hinge pin, at least one of said rollers having an overall concave shape.

3. A tool as claimed in claim 2, wherein a first said roller has a cylindrical shape, and further comprising a sharp-edged element mounted at a free end of said spindle of said first roller, said sharp-edged element extending substantially in the same plane as said sharp-edged blade.

4. A tool as claimed in claim 3, wherein said sharp-edged element is carried by said first handle and forms a preliminary cutting element.

5. A tool as claimed in claim 4, wherein said preliminary cutting element a loosely mounted circular blade.

6. A tool as claimed in claim 2, wherein a first said roller has a cylindrical shape, and further comprising a wheel mounted at a free end of said spindle of said first roller, said wheel extending in the plane of said sharp-edged blade.

7. A tool as claimed in claim 2, wherein said spindle of a first said roller is fixed to a free end of an arm mounted on the respective said handle so as to pivot relative thereto, and further comprising an adjustable stop device for limiting the extent of pivoting of said arm away from said clamp.

8. A tool as claimed in claim 7, wherein said adjustable stop device comprises a projecting element which is integral with said arm and which projects laterally so as to face said respective handle, a screw rod fixed in said respective handle and passing through an oblong slot provided in said projecting element, and a nut interacting with said rod so as to form an abutment for said projecting element.

9. A tool as claimed in claim 8, further comprising a resilient element biasing said arm towards said clamp.

10. A tool as claimed in claim 8, further comprising a resilient element biasing said arm away from said clamp.

11. A tool as claimed in claim 9, wherein said resilient element comprises a leaf spring integral with said arm and having a free end bearing against said respective handle.

12. A tool as claimed in claim 9, wherein said resilient element comprises a kickover spring mounted on a spindle about which pivots said arm and having one end bearing against said arm and another end bearing said respective handle.

13. A tool as claimed in claim 11, further comprising an adjustable stop element limiting the pivoting of said arm towards said clamp.

14. A tool as claimed in claim 13, wherein said stop element comprises a screw threaded through a hole provided in said projecting element and abutting said respective handle when said arm tilts towards said clamp.

* * * * *